United States Patent
Sakiyama et al.

(10) Patent No.: US 9,692,974 B2
(45) Date of Patent: Jun. 27, 2017

(54) APPARATUS AND METHODS FOR GENERATING VIDEO BASED ON MOTION SIMULATION OF AN OBJECT

(71) Applicant: RAKUTEN, INC., Shinagawa-ku, Tokyo (JP)

(72) Inventors: Shohei Sakiyama, Chofu (JP); Makoto Okabe, Chofu (JP); Rikio Onai, Chofu (JP); Hiromi Hirano, Shingawa-ku (JP)

(73) Assignee: Rakuten, Inc., Tokyo (JP)

( * ) Notice: Subject to any disclaimer, the term of this patent is extended or adjusted under 35 U.S.C. 154(b) by 196 days.

(21) Appl. No.: 14/517,314

(22) Filed: Oct. 17, 2014

(65) Prior Publication Data
US 2015/0109466 A1 Apr. 23, 2015

(30) Foreign Application Priority Data
Oct. 18, 2013 (JP) ................................. 2013-217364

(51) Int. Cl.
*H04N 5/232* (2006.01)
*H04N 5/272* (2006.01)

(52) U.S. Cl.
CPC ......... *H04N 5/23264* (2013.01); *H04N 5/272* (2013.01); *G06T 2210/24* (2013.01)

(58) Field of Classification Search
None
See application file for complete search history.

(56) References Cited

U.S. PATENT DOCUMENTS

| 2004/0024575 A1* | 2/2004 | Surazhsky | G06T 3/0093 703/2 |
| 2005/0154569 A1* | 7/2005 | Sapp | G10H 5/007 703/9 |
| 2006/0069536 A1* | 3/2006 | Butsev | G01N 29/0609 703/6 |
| 2006/0089803 A1* | 4/2006 | Lei | G06F 17/5018 702/1 |
| 2007/0239409 A1* | 10/2007 | Alan | G06F 17/5009 703/2 |

(Continued)

OTHER PUBLICATIONS

SnapDish Food Camera, [online] [Oct. 8, 2013] URL: https://itunes.apple.com/us/app/snapdish-food-camera-cook/id439571223.

(Continued)

*Primary Examiner* — Xiao Wu
*Assistant Examiner* — Steven Elbinger
(74) *Attorney, Agent, or Firm* — Sughrue Mion, PLLC

(57) ABSTRACT

An image creation device includes an acquisition unit that acquires an image to be processed, a region information acquisition unit that acquires region information specifying an object region where an object to be processed is shown in the image to be processed, a setting unit that sets a fixed control point, a vibration control point and a vibration direction based on a shape of the object region by referring to a storage unit storing a shape of the object in association with a fixed control point, a vibration control point and a vibration direction when the object vibrates, a creation unit that creates a video to be displayed with the object vibrating in accordance with the fixed control point, the vibration control point and the vibration direction, and an output unit that outputs the image to be processed where the video is superimposed.

6 Claims, 20 Drawing Sheets

(56) References Cited

U.S. PATENT DOCUMENTS

2014/0081612 A1* 3/2014 Ignatoff ................ G01N 11/00
                                                           703/9
2015/0077345 A1* 3/2015 Hwang ................ G06F 3/0412
                                                           345/173

OTHER PUBLICATIONS

Makoto Okabey, Ken Anjyoz, Rikio Onai, "Creating Fluid Animation from a Single Image using Video Database. Pacific Graphics 2011, vol. 30 (2011), No. 7".

Makoto Okabe, Ken Anjyo, Takeo Igarasi, Hans-Peter Seidel, "Animating Pictures of Fluid using Video Examples. Eurographics 2009, vol. 28 (2009), No. 2".

* cited by examiner

Fig.6

| REGION ID | DISTANCE FROM REFERENCE POSITION (HEAT SOURCE) | SIZE |
|---|---|---|
| 1 | FAR | LARGE |
| 2 | MIDDLE | SMALL |
| 3 | MIDDLE | SMALL |
| 4 | FAR | LARGE |
| 5 | MIDDLE | SMALL |
| 6 | CLOSE | SMALL |
| 7 | CLOSE | LARGE |
| 8 | CLOSE | SMALL |
| 9 | MIDDLE | MIDDLE |
| 10 | MIDDLE | SMALL |
| 11 | MIDDLE | SMALL |

Fig. 7

| ATTRIBUTE OF REGION | | | ATTRIBUTE OF IMAGE TO BE SUPERIMPOSED | | NUMBER OF OVERLAYS |
|---|---|---|---|---|---|
| DISTANCE FROM REFERENCE POSITION (HEAT SOURCE) | SIZE | | SIZE | PLAYBACK MATERIAL LENGTH | |
| CLOSE | LARGE | | 130% | 200% | 2 |
| CLOSE | MIDDLE | | 130% | 250% | 2 |
| CLOSE | SMALL | | 100% | 250% | 3 |
| MIDDLE | LARGE | | 130% | 150% | 1 |
| MIDDLE | MIDDLE | | 100% | 200% | 2 |
| MIDDLE | SMALL | | 100% | 250% | 3 |
| FAR | LARGE | | 130% | 100% | 1 |
| FAR | MIDDLE | | 100% | 150% | 2 |
| FAR | SMALL | | 50% | 200% | 3 |

Fig.9
(a)
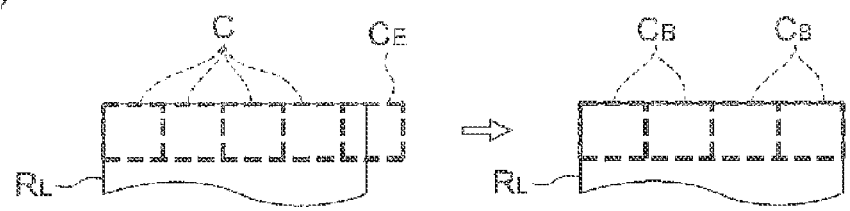
(b)
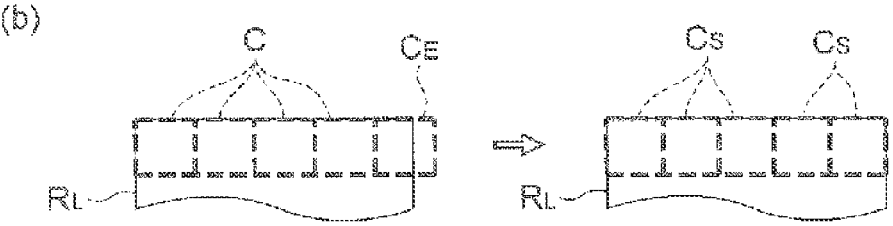

Fig.17

| REGION ID | CHANGE IN SHAPE/ NO CHANGE IN SHAPE | SHAPE TYPE |
|---|---|---|
| 1 | CHANGE IN SHAPE | 1 |
| 2 | NO CHANGE IN SHAPE | --- |
| 3 | CHANGE IN SHAPE | 3 |
| : | : | : |

Fig. 18
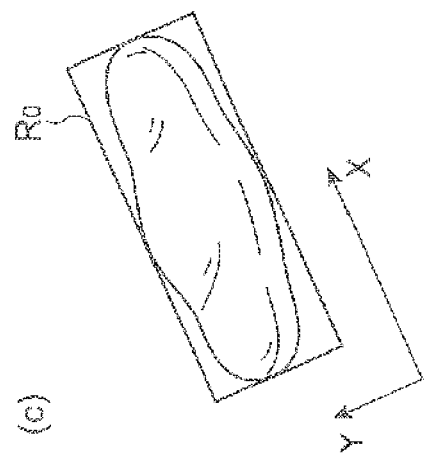
(c)
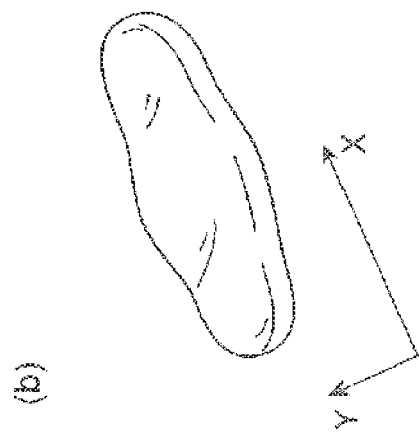
(b)
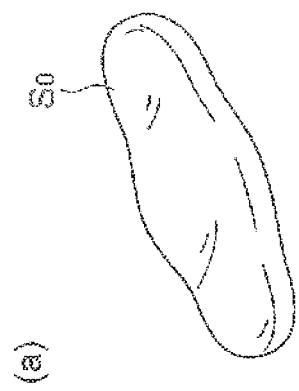
(a)

APPARATUS AND METHODS FOR GENERATING VIDEO BASED ON MOTION SIMULATION OF AN OBJECT

BACKGROUND OF THE INVENTION

Field of the Invention

The present invention relates to a video creation device and a video creation method.

Related Background Art

A technique that processes a food image obtained by taking a picture of food on a dish in order to make it look delicious to users is known (for example, see SnapDish Food Camera [iTunes][2013.10.08]). In this technique, the hue of the food image is converted.

SUMMARY OF THE INVENTION

There is a demand for taking a picture of food that shows a hot pot dish with ingredients such as leaf vegetables and meat in a soup or the like so that it looks delicious. However, the ingredients look delicious as they are floating in the pot by being heated. The ingredients are floating when a liquid such as a soup in which the ingredients are cooked is boiling; however, because the ingredients change in color and shape as they are heated, they look more delicious before being heated to high temperature or for a short period of time during heating in terms of the color and shape of the ingredients. Further, if a video of the process of heating is taken to shoot the cooking, it is not possible to take a video again using the same ingredients used for the shooting. Therefore, it is difficult to take a food picture where both of ingredients and a liquid such as a soup and oil look delicious.

In view of the foregoing, an object of the present invention is to easily obtain a food image where both of ingredients and a liquid in a dish look delicious even when it cannot be taken at the timing when the both look delicious.

To solve the above problem, a video creation device according to one aspect of the invention includes an image acquisition unit configured to acquire an image to be processed, a region information acquisition unit configured to acquire region information specifying an object region where an object to be processed is shown in the image to be processed, a setting unit configured to set a fixed control point, a vibration control point and a vibration direction in the object based on a shape of the object region specified by the region information by referring to a storage unit storing a shape of the object in association with a fixed control point indicating a part to be fixed in position, a vibration control point indicating a part to vibrate with respect to the fixed control point, and a vibration direction indicating a direction of vibration of the vibration control point when the object vibrates, and a creation unit configured to create a video to be displayed with the object vibrating in accordance with the fixed control point, the vibration control point and the vibration direction set by the setting unit.

A video creation method according to one aspect of the invention is a video creation method executed by a computer, the method including an image acquisition step of acquiring an image to be processed, a region information acquisition step of acquiring region information specifying an object region where an object to be processed is shown in the image to be processed, a setting step of setting a fixed control point, a vibration control point and a vibration direction in the object based on a shape of the object region specified by the region information by referring to a storage unit storing a shape of the object in association with a fixed control point indicating a part to be fixed in position, a vibration control point indicating a part to vibrate with respect to the fixed control point, and a vibration direction indicating a direction of vibration of the vibration control point when the object vibrates, and a creation step of creating a video to be displayed with the object vibrating in accordance with the fixed control point, the vibration control point and the vibration direction set in the setting step.

A video creation program according to one aspect of the invention causes a computer to implement an image acquisition function to acquire an image to be processed, a region information acquisition function to acquire region information specifying an object region where an object to be processed is shown in the image to be processed, a setting function to set a fixed control point, a vibration control point and a vibration direction in the object based on a shape of the object region specified by the region information by referring to a storage unit storing a shape of the object in association with a fixed control point indicating a part to be fixed in position, a vibration control point indicating a part to vibrate with respect to the fixed control point, and a vibration direction indicating a direction of vibration of the vibration control point when the object vibrates, and a creation function to create a video to be displayed with the object vibrating in accordance with the fixed control point, the vibration control point and the vibration direction set by the setting function.

According to the above aspects, the region information that specifies the object region S in the image to be processed is acquired, and a video that is displayed so that the object looks vibrating in accordance with the fixed control point, the vibration control point and the vibration direction set for the object region S is created. The video is superimposed on the image to be processed, and it is thereby possible to display the ingredients in the still image of food not being heated so that they look vibrating as the objects. It is thereby possible to add the motion like being heated to the region where ingredients that look delicious in terms of the color and shape because they are not being heated are shown, and it is possible to obtain the food image where both of the ingredients and the soup look delicious. Further, because the object region where an ingredient is shown is displayed to look vibrating based only on simple input that designates the region where an ingredient is shown as the object region, it is possible to easily obtain the food image where both of the ingredients and the soup look delicious.

In the video creation device according to another aspect, the storage unit may store the fixed control point, the vibration control point and the vibration direction in association with a rectangular region indicating an object shape, and the setting unit may set a rectangular region having sides in parallel with a lengthwise direction of the object region obtained by specified image processing and a crosswise direction orthogonal to the lengthwise direction and in which the object region is inscribed, and sets the fixed control point, the vibration control point and the vibration direction for the rectangular region by referring to the storage unit.

According to this aspect, it is possible to appropriately set the fixed control point, the vibration control point and the vibration direction when the object region is placed in any direction in the image to be processed.

In the video creation device according to another aspect, the setting unit may receive designation of an attribute indicating change in shape or no change in shape of the object from a user and, when the attribute indicating change in shape is received, set the fixed control point, the vibration control point and the vibration direction for the object region, and the creation unit may create a video to be displayed with the object vibrating in accordance with the fixed control point, the vibration control point and the vibration direction set by the setting unit when the attribute indicating change in shape is received by the setting unit, and create a video to be displayed with the object vibrating, maintaining the shape of the object region, when the attribute indicating no change in shape is received by the setting unit.

According to this aspect, it is possible to represent the motion of vibration in accordance with the type of an ingredient shown in the object region designated in the food image.

In the video creation device according to another aspect, the creation unit may control a degree of vibration of the object in accordance with a size of the object region.

According to this aspect, because it is possible to represent the degree of vibration in accordance with the size of an ingredient shown in the object region, a more real image can be obtained.

In the video creation device according to another aspect, the region information acquisition unit may acquire a region to be processed which is a region outside the object region in the image to be processed and on which an image to be superimposed being a video where a liquid in motion is shown is to be superimposed, the video creation device further includes an image-to-be-superimposed acquisition unit configured to acquire the image to be superimposed based on a parameter indicating a feature of the region to be processed acquired by the region information acquisition unit, and a superimposition unit configured to superimpose the image to be superimposed acquired by the image-to-be-superimposed acquisition unit on the region to be processed, and the creation unit may set a degree of vibration of the object in accordance with an attribute of the image to be superimposed that is superimposed on the region to be processed at a position within a specified distance from the object region.

According to this aspect, because the degree of vibration of the object is set according to the attribute indicating the feature of the motion of the image to be superimposed that is superimposed on the region where a liquid is shown in the food image, it is possible to obtain an image that shows the vibration of the ingredients in accordance with the motion of the liquid near the ingredients.

According to one aspect of the present invention, it is possible to easily obtain a food image where both of ingredients and a liquid contained in the dish look delicious based on a still image of the food.

BRIEF DESCRIPTION OF THE DRAWINGS

FIG. 6 is a diagram showing parameters of each region to be processed extracted by an image-to-be-superimposed acquisition unit.

FIG. 7 is a diagram showing an example of a table used for acquisition of attributes of an image to be superimposed.

FIG. 9 is a diagram illustrating an example of superimposition by enlarging or reducing the size of all images to be superimposed arranged in a rectangular region when a side of a rectangular image to be superimposed placed at an end of the rectangular region does not coincide with a side of the end of the rectangular region.

FIG. 17 is a diagram showing a table storing an attribute indicating change in shape or no change in shape and a shape type designated for each object region.

FIG. 18 is a diagram showing an example of settings of a rectangular region for setting a fixed control point, a vibration control point and a vibration direction in an object region.

DESCRIPTION OF THE PREFERRED EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

First Embodiment

Figure 1:
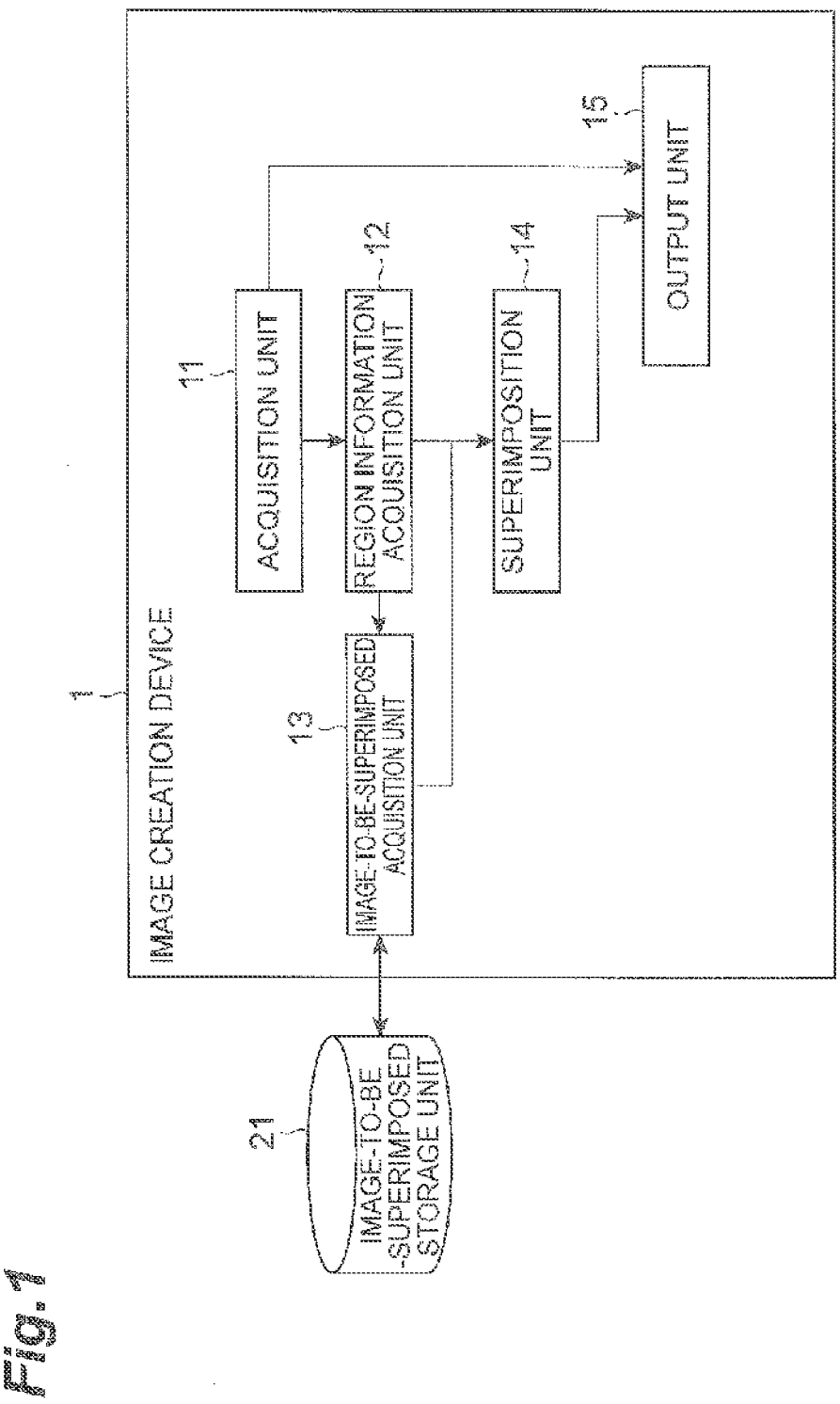
FIG. 1 is a block diagram showing a functional configuration of an image creation device.

FIG. 1 is a block diagram showing a functional configuration of an image creation device 1 according to this embodiment. The image creation device 1 is a device that, in an image to be processed, which is a still image showing food, superimposes an image to be superimposed, which is a video showing a liquid in motion, on a region to be processed which mainly shows a liquid and then outputs the image. In this embodiment, assuming that the image to be superimposed is a video showing the state where bubbles are formed in a heated liquid, and the region to be processed is a part showing a soup of the food image showing ingredients such as vegetables and meat and the soup, an example of creating the video showing the state where bubbles are formed in a region showing the soup in the food image is described.

As shown in FIG. 1, the image creation device 1 according to this embodiment functionally includes an acquisition unit 11, a region information acquisition unit 12, an image-to-be-superimposed acquisition unit 13, a superimposition unit 14, and an output unit 15. Further, the functional units 11 to 15 of the image creation device 1 can access a storage means such as an image-to-be-superimposed storage unit 21. Note that the image creation device 1 can be configured in a server that can communicate with a user terminal through a network. Further, the image creation device 1 may be configured in a device such as a smartphone or a personal computer.

Figure 2:
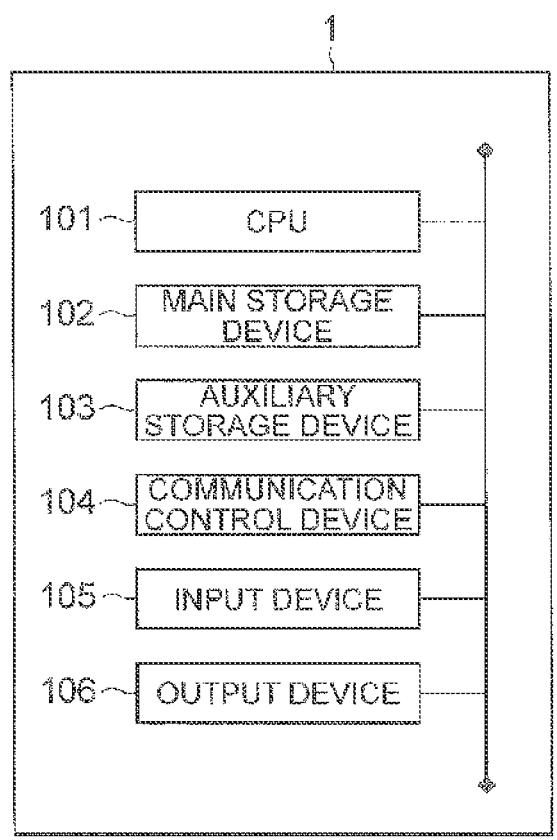
FIG. 2 is a diagram showing a hardware configuration of an image creation device.

FIG. 2 is a hardware configuration diagram of the image creation device 1. As shown in FIG. 2, the image creation device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like. Note that, in the case where the image creation device 1 is configured in a server, the image creation device 1 does not need to include the input device 105 and the output device 106.

The functional units shown in FIG. 1 are implemented by loading given computer software (image creation program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the image creation device 1, the image-to-be-superimposed storage unit 21 is described hereinafter. The image-to-be-superimposed storage unit 21 is a storage means that stores an image to be superimposed, which is a video showing a liquid in motion. In this embodiment, the image-to-be-superimposed storage unit 21 stores a plurality of videos showing the state where bubbles are formed in a heated liquid as the images to be superimposed.

The images to be superimposed stored in the image-to-be-superimposed storage unit 21 have variations in liquid type, size and playback speed. The variations of the liquid type include water, soy sauce, Worcestershire sauce and the like, for example, and a difference in the viscosity of a liquid is represented by a difference in variations. Further, a difference in bubble size is represented by a difference in the size of the image to be superimposed. A time from appearance to disappearance of bubbles is represented by a difference in the playback speed of the image to be superimposed. The time from appearance to disappearance of bubbles depends on the fire power when the food is heated. Further, the images to be superimposed may include a plurality of images obtained by shooting pictures of bubbles formed in a heated liquid from different angles. A difference in the height of bubbles formed is represented by a difference in shooting angle.

Figure 3:
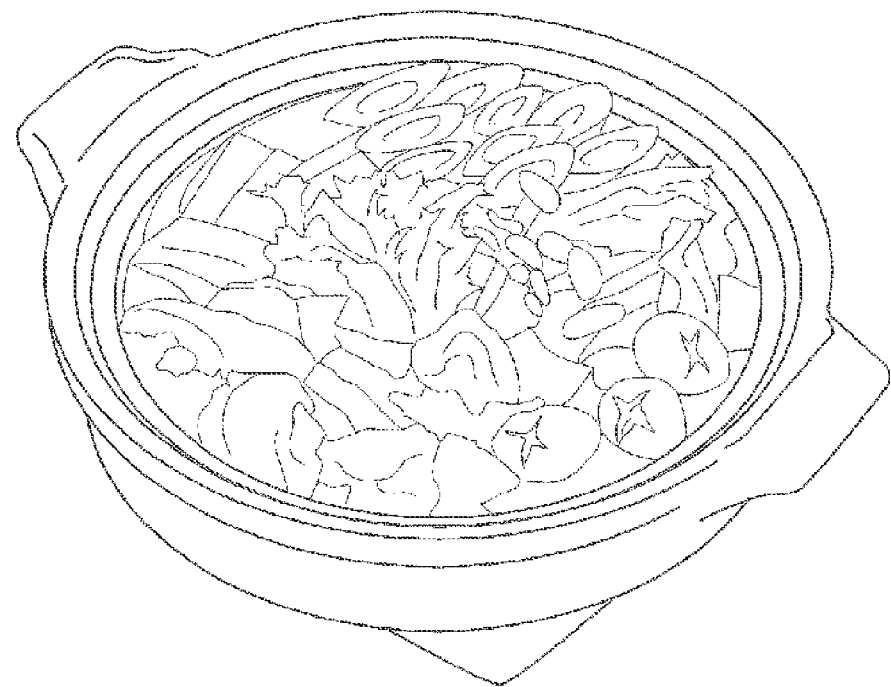
FIG. 3 is a diagram showing an example of an image to be processed acquired by an acquisition unit.

The functional units of the image creation device 1 are described hereinbelow. The acquisition unit 11 is a part that acquires an image to be processed. FIG. 3 is a diagram showing an example of an image to be processed acquired by the acquisition unit 11. As shown in FIG. 3, a food image showing a hot pot dish with ingredients such as vegetables and meat in a soup is acquired as the image to be processed in this embodiment. The image to be processed in this embodiment is a still image.

Figure 4:
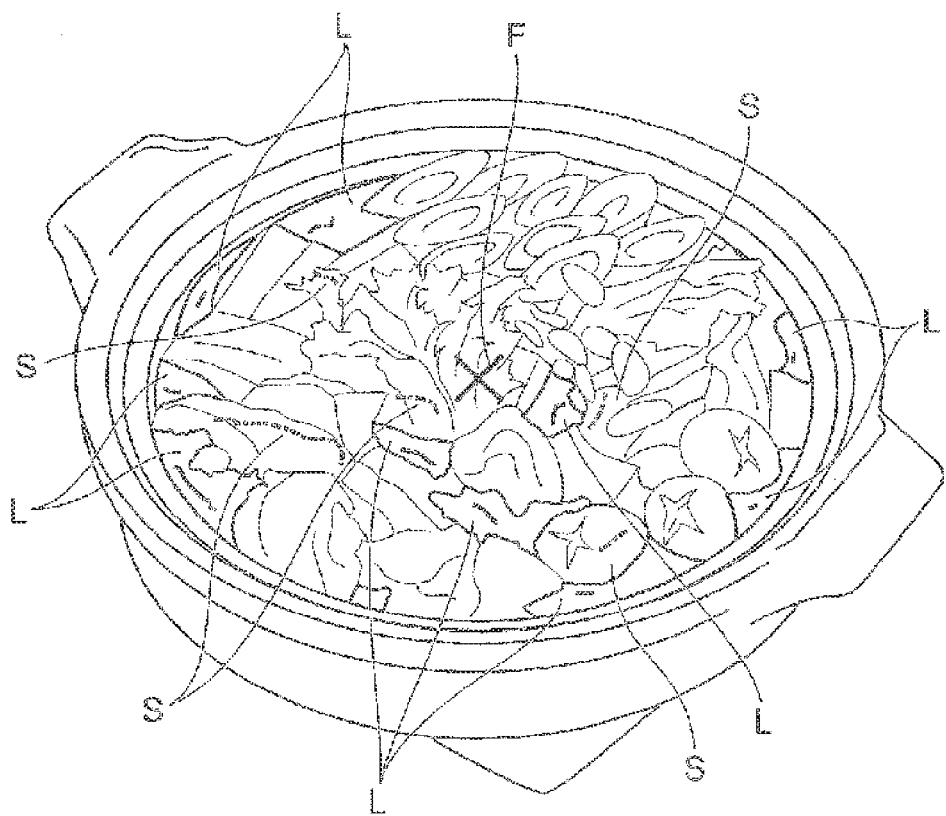
FIG. 4 is a diagram showing an example of receiving the designation of a region to be processed on the displayed image to be processed from a user.

The region information acquisition unit 12 is a part that receives the designation of a region to be processed in the image to be processed. FIG. 4 is a diagram showing an example of receiving the designation of a region to be processed in the displayed image to be processed from a user. As shown in FIG. 4, a user can designate the region to be processed by drawing a line in a region where a soup, which is a part to be processed, is shown, for example. In FIG. 4, a line drawn by a user is indicated by a solid line. The region information acquisition unit 12 can specify an image to be processed by a known image processing technique such as a region divider, for example, based on the drawn line. For example, the region information acquisition unit 12 can recognize an adjacent pixel where the degree of difference in color from a part where the line is drawn is a specified value or less as the same region, and the boundary from a pixel where the degree of difference in color is more than a specified value as the boundary of the region. As shown in FIG. 4, the region information acquisition unit 12 acquires the regions L to be processed based on the input of lines indicated by the solid lines.

The region to be processed that is acquired herein is not a still image taken by shooting a liquid in motion. Specifically, the image showing a liquid such as a soup in the image to be processed is not taken by shooting a liquid that is heated to be in motion.

Further, the region information acquisition unit 12 can receive the designation of a reference position F that is input by a user. The reference position F can indicate the position where heat is produced when the food shown on the food image is heated.

Further, besides the image to be processed, the region information acquisition unit 12 can receive the designation of an object region, which is a region where an ingredient is shown. Specifically, the region information acquisition unit 12 receives the designation of an object region S where an ingredient is shown based on the input of a line drawn by a user on a part where an ingredient is shown. In FIG. 4, the line for designating the object region S is indicated by a dotted and dashed line. Processing for the object region S where an ingredient is shown is described later as a second embodiment.

Figure 5:
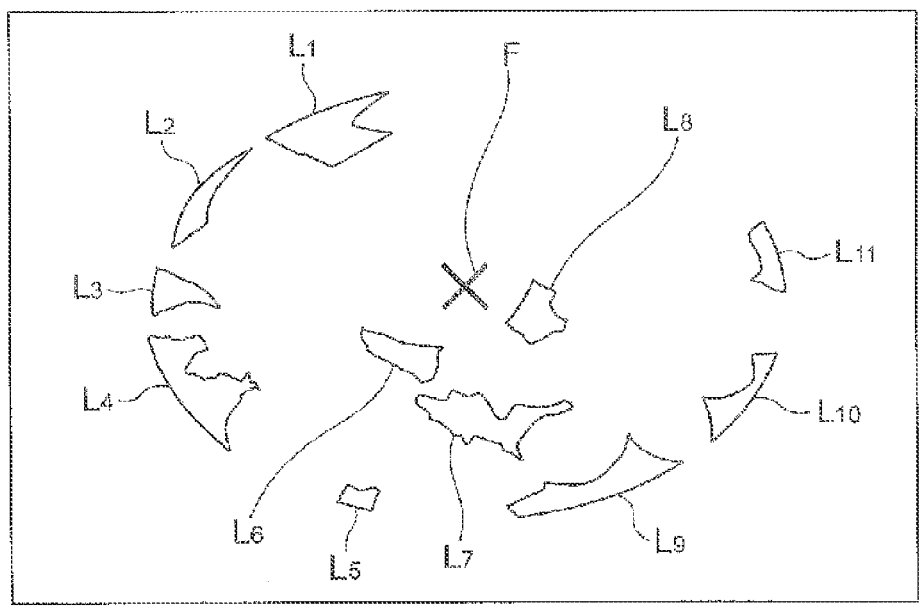
FIG. 5 is a diagram schematically showing an example of a mask generated based on a region to be processed designated by a region information acquisition unit.

The image-to-be-superimposed acquisition unit 13 is a part that acquires parameters (feature parameters) indicating the features of the region L to be processed, the designation of which is received by the region information acquisition unit 12, and acquires the image to be superimposed on the region to be processed based on the acquired parameters. To be specific, the image-to-be-superimposed acquisition unit 13 first generates a mask representing the regions L to be processed in the image to be processed. FIG. 5 is a diagram schematically showing an example of a mask indicating the regions L to be processed (see FIG. 4) that are designated by the region information acquisition unit 12. As shown in FIG. 5, 11 regions L to be processed are extracted in this example.

Next, the image-to-be-superimposed acquisition unit 13 calculates and normalizes the distance from the reference position F and the size of each of the extracted regions L to be processed and acquires them as the parameters of each region L to be processed. The acquired parameters affect the motion of a liquid. The distance from the reference position F to the region L to be processed is obtained by calculating the center of mass position of the region L to be processed and calculating the distance from the reference position F to the center of mass position, for example. Further, the size of the region L to be processed is obtained based on the number of pixels of the region L to be processed, for example.

As the distance parameter from the reference position F, any one of "far", "middle" and "close" is given. As the size parameter, any one of "large", "middle" and "small" is given. FIG. 6 is a diagram showing the parameters of each region L to be processed extracted by the image-to-be-superimposed acquisition unit 13. As shown in FIG. 6, the region $L_1$ to be processed (see FIG. 5) is indicated by a region ID "1", and the parameters such as the distance from the reference position F "far" and the size "large" are associated.

Those parameters indicate the features of the region L to be processed and do not indicate the features of an object shown in the region L to be processed. In this embodiment, because the image to be superimposed is acquired based on the parameters indicating the features of the region L to be processed, the object shown in the region L to be processed does not need to be a liquid in motion.

After that, the image-to-be-superimposed acquisition unit 13 acquires the attributes of the image to be superimposed (image-to-be-superimposed information) that is to be superimposed on the region L to be processed according to the parameters of the extracted region L to be processed. FIG. 7 is a diagram showing an example of a table that is used to acquire the attributes of the image to be superimposed. This table may be held in advance by the image-to-be-superimposed acquisition unit 13 or stored in a storage means such as the image-to-be-superimposed storage unit 21. The image-to-be-superimposed acquisition unit 13 acquires the attributes of the image to be superimposed, such as the size "100%" and the playback material length "150%", by referring to the table of FIG. 7 based on the parameters of the region $L_1$ to be processed, such as the distance from the reference position F "far" and the size "middle", for example. The size indicates the percentage of a size with respect to the image to be superimposed with a specified reference size, and the playback material length indicates the percentage of a playback time with respect to a video with a specified reference length. Accordingly, as the value of the playback material length is larger, the playback speed is slower.

Note that, although the image-to-be-superimposed acquisition unit 13 obtains the attributes of the image to be superimposed by referring to a preset table based on the parameters of the region L to be processed in this embodiment, it may obtain the attributes using mathematical expressions. Specifically, when the size of a region to be processed is a(i) and the distance from a reference position is d(i), the size S(i) and playback speed V(i) of the image to be superimposed are represented by the following expressions (1) and (2), respectively.

[Expression 1]

$$S(i) \propto a(i) \cdot d(i) \quad (1)$$

[Expression 2]

$$V(i) \propto \frac{a(i)}{d(i)} \quad (2)$$

If the image-to-be-superimposed acquisition unit 13 uses those mathematical expressions, it is not necessary to preset the table as shown in FIG. 7.

In the case where overlay processing (second superimposition processing) that overlays the image to be superimposed on the region to be processed is performed in the superimposition of the image to be superimposed on the region L to be processed, which is described later, the image-to-be-superimposed acquisition unit 13 further acquires the number of overlays (image-to-be-superimposed information), which is the attribute in superimposition processing indicating the number of overlays in the overlay processing. For the superimposition processing on the region $L_1$ to be processed, the image-to-be-superimposed acquisition unit 13 acquires the parameter such as the number of overlays "2".

The image-to-be-superimposed acquisition unit 13 may further receive the designation of the parameters indicating the features of the image to be superimposed (feature parameters) by a user. The parameters indicating the features of the image to be superimposed may indicate the type of a liquid such as water, soy sauce and Worcestershire sauce, for example. In the image-to-be-superimposed storage unit 21, videos showing the state where each of those liquids is heated and bubbles are formed therein with a plurality of variations in the size and the playback material length are stored as the images to be superimposed. A difference in the viscosity of a liquid is represented by the designation of the type of a liquid. Note that, although the image to be superimposed in this embodiment is a video showing the state where bubbles are formed in a heated liquid, it may be a still image showing the motion of a liquid.

Then, the image-to-be-superimposed acquisition unit 13 acquires the image to be superimposed corresponding to the acquired attributes of the image to be superimposed from the image-to-be-superimposed storage unit 21. For example, the image-to-be-superimposed acquisition unit 13 acquires the image to be superimposed having the attributes of the size "100%" and the playback material length "150%" as the image to be superimposed on the region $L_1$ to be processed. Further, in the case where the parameters indicating the features of the image to be superimposed are designated by a user, the image-to-be-superimposed acquisition unit 13 acquires the image to be superimposed corresponding to the designation and having the attributes of the size "100%" and the playback material length "150%".

Note that, in this embodiment, variations of the image to be superimposed with different sizes and playback speeds are stored in the image-to-be-superimposed storage unit 21, and the attributes of those variations are acquired as the attributes of the image to be superimposed (image-to-be-superimposed information) by the image-to-be-superimposed acquisition unit 13. On the other hand, in the case where variations in the size and the playback speed are not stored in the image-to-be-superimposed storage unit 21, one image to be superimposed for each type of a liquid may be stored in the image-to-be-superimposed storage unit 21, and the image with the size and the playback speed corresponding to the attributes of the image to be superimposed (image-to-be-superimposed information) acquired by reference to the table of FIG. 7 may be generated by the image-to-be-superimposed acquisition unit 13.

The superimposition unit 14 is a part that superimposes the image to be superimposed that is acquired by the image-to-be-superimposed acquisition unit 13 onto the region to be processed. First, the way of placing the image to be superimposed on the region L to be processed in this superposition processing is described with reference to FIG. 8.

As shown in FIG. 8(a), the superimposition unit 14 sets a rectangular region $R_L$ in which the region L to be processed is inscribed. Next, as shown in FIG. 8(b), the superimposition unit 14 places images C to be superimposed in a grid arrangement in the rectangular region $R_L$. Then, as shown in FIG. 8(c), the superimposition unit 14 forms a mask M to avoid display of the images C to be superimposed in a region outside the region L to be processed in the rectangular region $R_L$ and superimposes the arranged images C to be superimposed on the region L to be processed.

Further, when a side of a rectangular image to be superimposed placed at the end of the rectangular region $R_L$ does not coincide with a side of the end of the rectangular region $R_L$ because the length of one side of the rectangular region $R_L$ dos not correspond to the integral multiple of the length of one side of the image C to be superimposed, the superimposition unit 14 enlarges or reduces the size of all of the images C to be superimposed that are arranged in the rectangular region $R_L$ and then superimposes them.

To be specific, as shown in FIG. 9(a), when a side of an image $C_E$ to be superimposed that is placed at the end of the rectangular region $R_L$ does not coincide with a side of the end of the rectangular region $R_L$ and more than half the area of the image $C_E$ to be superimposed does not fall within the rectangular region $R_L$, the superimposition unit 14 enlarges all of the arranged images C to be superimposed to obtain images $C_B$ to be superimposed, so that the side of the arranged image C to be superimposed coincides with the side of the rectangular region.

Further, as shown in FIG. 9(b), when a side of an image $C_E$ to be superimposed that is placed at the end of the rectangular region $R_L$ does not coincide with a side of the end of the rectangular region $R_L$ and more than half the area of the image $C_E$ to be superimposed falls within the rectangular region $R_L$, the superimposition unit 14 reduces all of the arranged images C to be superimposed to obtain images $C_S$ to be superimposed, so that the side of the arranged image C to be superimposed coincides with the side of the rectangular region.

Note that, although the images C to be superimposed are arranged in an array and superimposed on the region L to be processed in the above-described example, the superimposition unit 14 may arrange the images C to be superimposed in the rectangular region $R_L$ in which the region L to be processed is inscribed in a random manner. In this case, the superimposition unit 14 may arrange the images C to be superimposed in a partially overlapping manner so that there is no area where the image C to be superimposed is not superimposed on the region L to be processed.

Hereinafter, synthesis of a color component in the superimposition processing that superimposes the image to be superimposed on the region to be processed is described. The superimposition unit 14 can perform synthesis processing (first superimposition processing) that adds a lightness component of the image C to be superimposed acquired by the image-to-be-superimposed acquisition unit 13 to the region L to be processed as one of superimposition processing of a color component of the image to be superimposed.

Figure 10:
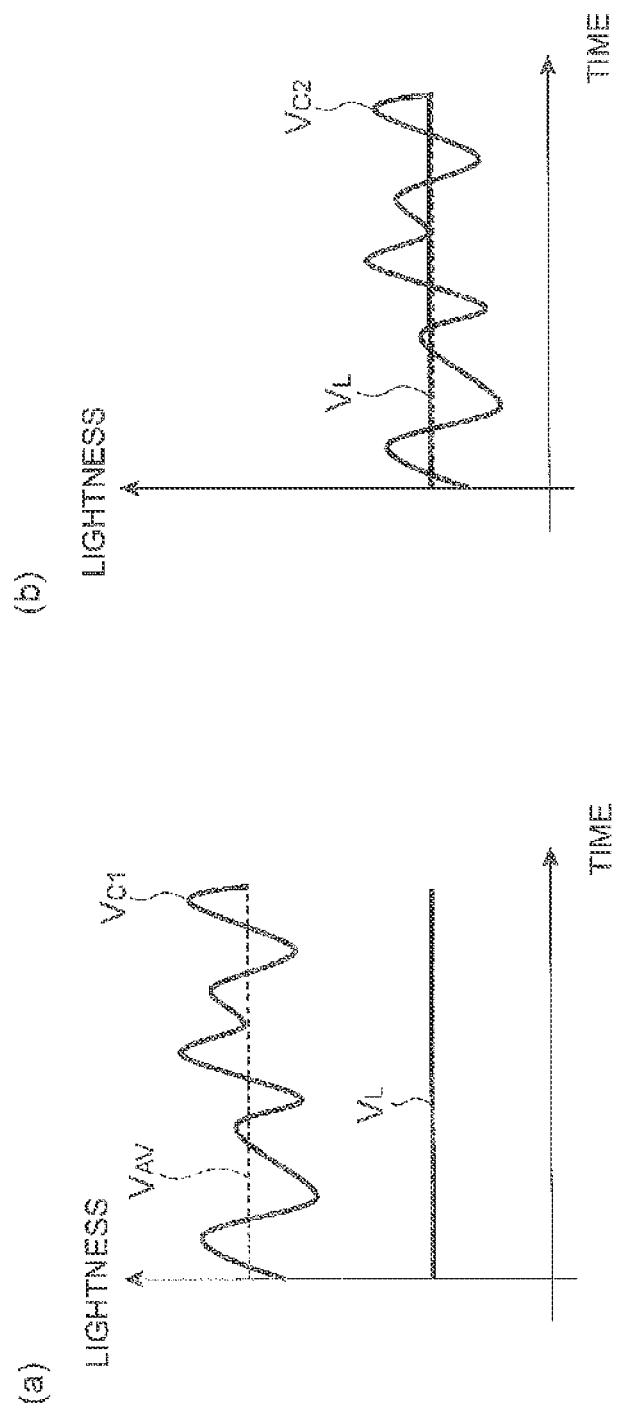
FIG. 10 is a diagram conceptually illustrating a synthesis of a lightness component of an image to be superimposed with a region to be processed.

The image C to be superimposed is a video having a concept of time, and its pixel value varies with time. The motion of a liquid in the video is suitably represented by the variation of a lightness component. Specifically, by synthesizing the a lightness component of the image C to be superimposed, which is a video showing appearance and disappearance of bubbles, in the region L to be processed, a time-varying image where bubbles appear and disappear in the region L to be processed can be obtained. To be specific, the superimposition unit 14 synthesizes a change in lightness with time for each pixel in the image C to be superimposed in the corresponding pixel in the region L to be processed. FIG. 10 is a diagram conceptually illustrating the synthesis of a lightness component of an image to be superimposed in a region to be processed. FIG. 10(a) shows a lightness component $V_{C1}$ in one pixel of the image C to be superimposed, a time-average value $V_{AV}$ of the lightness component $V_{C1}$, and a lightness value $V_L$ of a corresponding pixel in the region L to be processed, which is a still image. As shown in FIG. 10(b), the superimposition unit 14 offsets the lightness component $V_{C1}$ to the lightness component $V_{C2}$ so that the time-average value $V_{AV}$ coincides with the lightness value $V_L$ and thereby superimposes the image C to be superimposed, which is a video, on the region L to be processed.

Further, the superimposition unit 14 can perform overlay processing (second superimposition processing) that overlays the image C to be superimposed on the region L to be processed in accordance with the number of overlays corresponding to the parameters of the region L to be processed as one of superimposition processing of a color component of the image to be superimposed. The number of overlays for the overlay processing is acquired by the image-to-be-superimposed acquisition unit 13 by referring to the table shown in FIG. 7 according to the parameters of the region L to be processed, for example. By increasing the number of overlays when overlaying the image C to be superimposed, which is a video showing appearance and disappearance of bubbles, on the region L to be processed, the motion of a liquid is more clearly represented. Accordingly, by overlaying the image C to be superimposed with the number of overlays corresponding to the parameters of the region L to be processed, it is possible to represent the features of the motion of a liquid that is suitable for the attributes of the region L to be processed.

Further, the superimposition unit 14 may perform one of the superimposition processing that adds the lightness component of the image C to be superimposed to the region L to be processed and the superimposition processing that overlays the image C to be superimposed on the region L to be processed based on the distance between the color of the image C to be superimposed acquired by the image-to-be-superimposed acquisition unit 13 and the color of the region L to be processed in the color space.

To be specific, the superimposition unit 14 calculates the distance between the average value of the pixel value indicating the color of the image C to be superimposed acquired by the image-to-be-superimposed acquisition unit 13 and the average value of the pixel value indicating the color of the region on which the image C is to be superimposed in the region L to be processed in the color space. Then, when the calculated distance is a specified value or less, the superimposition unit 14 performs the superimposition processing that adds the lightness component of the image C to be superimposed to the region L to be processed. On the other hand, when the calculated distance is more than a specified value, the superimposition unit 14 performs the superimposition processing that overlays the image C to be superimposed on the region L to be processed. It is thereby possible to select the better superimposition processing in order to represent the motion of a liquid in the region L to be processed in a more suitable manner.

Note that the superimposition unit 14 may apply blurring to the region L to be processed before superimposing the image C to be superimposed on the region L to be processed. To be specific, the superimposition unit 14 may perform blurring on the image in the region L to be processed. Further, the superimposition unit 14 may calculate the average of the pixel value indicating the color of each pixel of the image in the region L to be processed and uses the calculated average value as the pixel value of each pixel of the image in the region L to be processed. A more natural superimposition image can be obtained by those processing.

Figure 11:
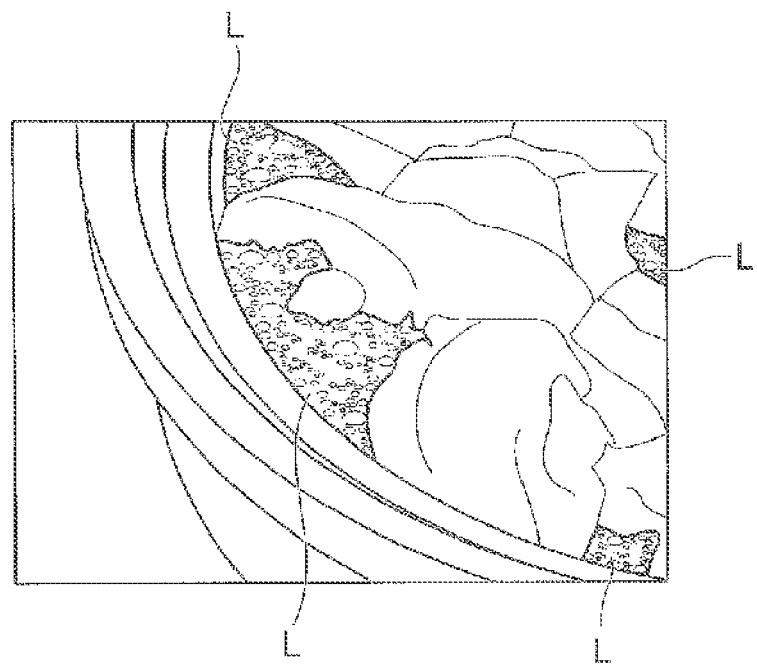
FIG. 11 is a diagram showing a part of an image to be processed where an image to be superimposed is superimposed on a region to be processed.

Referring back to FIG. 1, the output unit 15 is a part that outputs the image to be processed on which the image C is superimposed by the superimposition unit 14. FIG. 11 is a diagram showing a part of the image to be processed where the image C to be superimposed is superimposed on the region L to be processed. As shown in FIG. 11, the output unit 15 outputs the image where the image C to be superimposed showing the state where bubbles are formed is superimposed on the region L to be processed in the image to be processed shown in FIG. 3. Because a video of a liquid in motion can be superimposed on a part of the image to be processed, which is a still image, the food image on the base image to be processed does not need to be the one showing the food being heated. It is thereby possible to output the food image showing ingredients that look delicious because they are not being heated and a liquid such as a soup that looks delicious because it is in motion.

Figure 8:
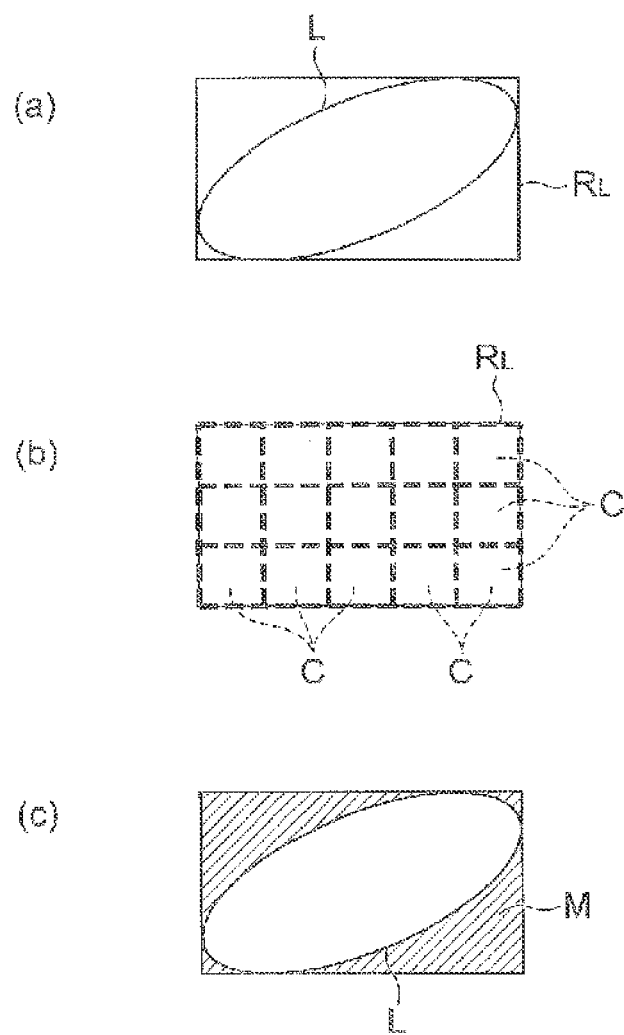
FIG. 8 is a diagram illustrating the way of arranging images to be superimposed on a region to be processed.

In the example described with reference to FIGS. 8 and 9, one or more of the same images C to be superimposed are superimposed on one region L to be processed. In the image creation device 1 according to this embodiment, exception handling in which the image to be superimposed that is suitable for the position where it is to be superimposed is selected and superimposed may be performed when superimposing the images to be superimposed on one region L to be processed. A specific example is described hereinafter.

In the case where the size of the region L to be processed is a specified size or more relative to the size of the image to be processed, the image-to-be-superimposed acquisition unit 13 may acquire the image to be superimposed to which the playback speed and/or the size is set according to the distance from the reference position F to the position where the image is to be superimposed in the region L to be processed when acquiring the image to be superimposed.

In the case where the size of the region L to be processed is a specified size or more relative to the size of the image to be processed, if the same images C to be superimposed are arranged and superimposed all over the region L to be processed, an unnatural image where the same bubbles are formed uniformly all over the region L to be processed is output. To avoid such an unnatural image, after tentative arrangement of the images C to be superimposed in the region L to be processed is done by the superimposition unit 14, the image-to-be-superimposed acquisition unit 13 acquires the attributes of the image to be superimposed in accordance with the distance from the reference position F to the placement position of one image C to be superimposed by referring to the table (see FIG. 7) in which the distance from the reference position and the attributes of the image to be superimposed are associated with each other. Then, the image-to-be-superimposed acquisition unit 13 acquires the image to be superimposed corresponding to the acquired attributes, and the superimposition unit 14 superimposes the acquired image to be superimposed on the placement position.

Further, in the case where the size of the region L to be processed is a specified size or more relative to the size of the image to be processed, the superimposition unit 14 may overlay the image to be superimposed on the region to be processed in accordance with the number of overlays corresponding to the distance from the reference position F in the image to be processed to the position where the image to be superimposed is placed in the region L to be processed.

Specifically, after tentative arrangement of the images C to be superimposed in the region L to be processed is done by the superimposition unit 14, the superimposition unit 14 acquires the number of overlays corresponding to the distance from the reference position F to the placement position of one image C to be superimposed by referring to the table (see FIG. 7) in which the distance from the reference position and the number of overlays in the overlay processing are associated with each other. Then, the superimposition unit 14 superimposes the image to be superimposed on the placement position in accordance with the acquired number of overlays.

As described above, even when the size of the region L to be processed is a specified size or more relative to the size of the image to be processed, by selecting and superimposing the image to be superimposed in accordance with the distance from the reference position F, which is assumed to be the position where heat is produced in the food image, it is possible to obtain a suitable image to be superimposed where the motion of a liquid such as formation of bubbles is not unnatural.

Further, in light of the fact that, when food including ingredients and a soup is heated, bubbles are formed slowly in a part of the soup near the ingredients compared with a part away from the ingredients, a specified weight may be assigned to the image to be superimposed that is superimposed on the part near the ingredients in the region L to be processed. To be specific, after tentative arrangement of the images C to be superimposed in the region L to be processed is done by the superimposition unit 14, when the position where the image to be superimposed is placed in the region L to be processed is within a specified distance from the edge of the region to be processed, the image-to-be-superimposed acquisition unit 13 acquires the image to be superimposed where a specified weight is assigned to the playback speed and/or the size of the image to be superimposed. For example, the image-to-be-superimposed acquisition unit 13 acquires the image to be superimposed with a larger playback material length than the tentatively arranged image to be superimposed from the image-to-be-superimposed storage unit 21. Then, the superimposition unit 14 superimposes the acquired image to be superimposed on the placement position.

Further, the superimposition unit 14 may assign a specified weight to the number of overlays when superimposing the image to be superimposed. To be specific, after tentative arrangement of the images C to be superimposed in the region L to be processed is done by the superimposition unit 14, the superimposition unit 14 sets the number of overlays in the overlay processing to which a specified weight is applied to the image to be superimposed that is placed within a specified distance from the edge of the region L to be processed, and superimposes the image to be superimposed in accordance with the set number of overlays. Because the image to be superimposed is superimposed with an appropriate weight assigned to the part near ingredients in the region L to be processed, the image appropriately showing the motion of a liquid at the edge of the region to be processed can be obtained.

Figure 12:
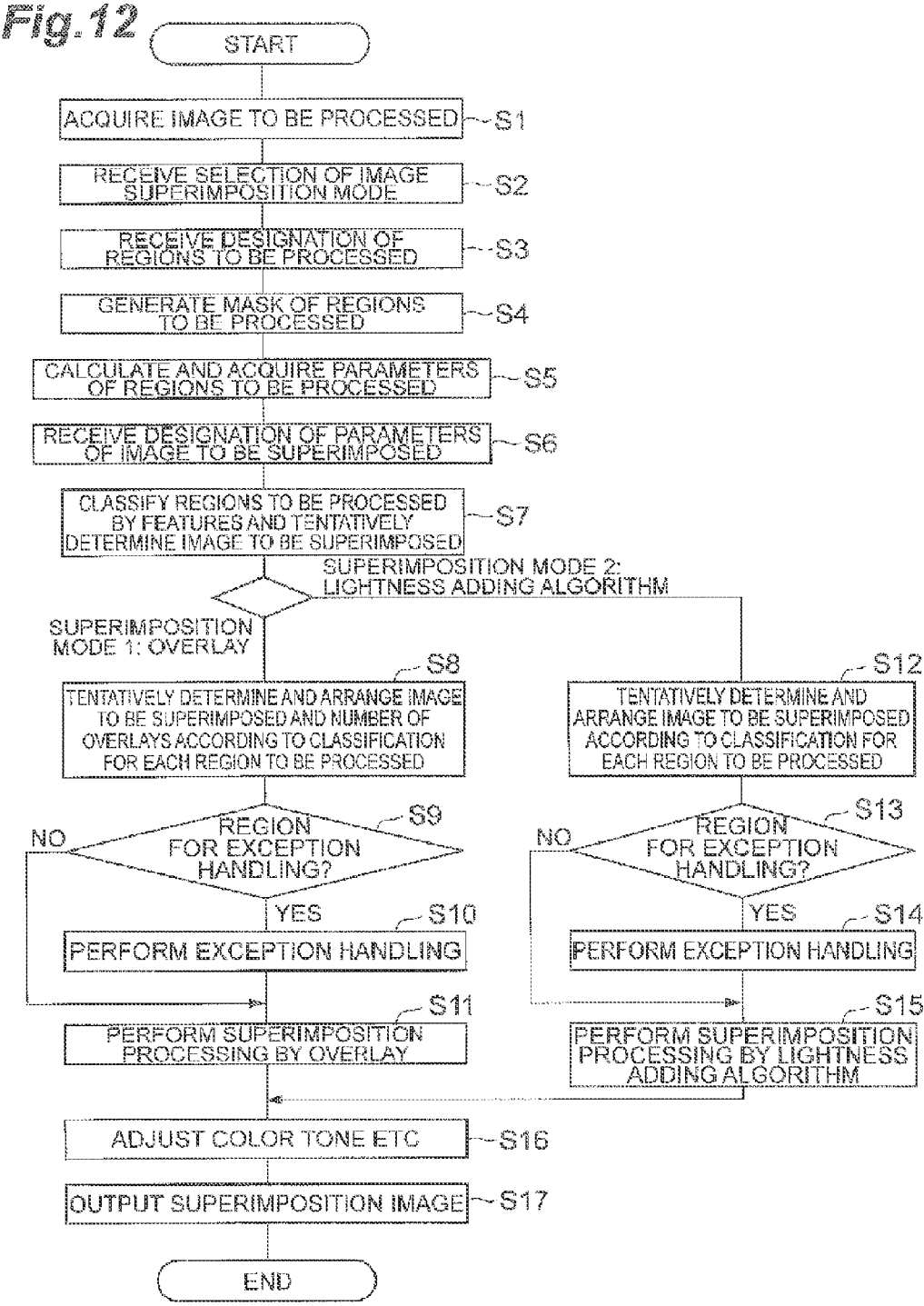
FIG. 12 is a flowchart showing an example of a process for an image creation method in an image creation device.

An image creation method according to this embodiment is described hereinafter with reference to FIG. 12. FIG. 12 is a flowchart showing an example of a process for the image creation method in the image creation device 1 shown in FIG. 1.

First, the acquisition unit 11 acquires the image to be processed, which is a still image to be processed (S1). Next, the region information acquisition unit 12 receives the selection of a superimposition mode of the image from a user (S2). Specifically, the selection of either lightness adding algorithm (first superimposition processing) or overlay (second superimposition processing) is received as a method for the processing. Note that, although the selection of the superimposition mode is explicitly received from a user in the flowchart of FIG. 12, the superimposition mode may be selected automatically by the superimposition unit 14.

Then, the region information acquisition unit 12 receives the designation of the regions to be processed in the image to be processed (S3). After that, the image-to-be-superimposed acquisition unit 13 generates a mask representing the regions L to be processed in the region L to be processed (S4). The image-to-be-superimposed acquisition unit 13 then calculates and acquires parameters such as the distance from the reference position F and the size of each of the extracted regions L to be processed (S5). In this step, the image-to-be-superimposed acquisition unit 13 may further receive the designation of parameters indicating the features of the image to be superimposed by a user (S6). The image-to-be-superimposed acquisition unit 13 then classifies the regions to be processed based on the parameters and tentatively determines the image to be superimposed according to the parameters and acquires it from the image-to-be-superimposed storage unit 21 (S7). Note that, in the case where overlay is selected as the superimposition mode, the image-to-be-superimposed acquisition unit 13 further acquires the number of overlays according to the parameters of the region to be processed.

In the case where overlay is selected as the superimposition mode, the process proceeds to Step S8. On the other hand, when superimposition by lightness adding algorithm is selected as the superimposition mode, the process proceeds to Step S12.

In Step S8, the superimposition unit 14 tentatively arranges the image to be superimposed acquired in Step S7 for superimposition on the region to be processed (S8). Further, the superimposition unit 14 tentatively determines the number of overlays acquired in Step S7. It is determined in this step whether there is a region to perform exception handling (S9). One of the exception handling is processing that superimposes the image to be superimposed having the playback speed and size according to the distance from the reference position F in the image to be processed when there is a region to be processed that has a specified size or more relative to the image to be processed. The other exception handling is processing that assigns a specified weight to the image to be superimposed that is superimposed on the edge of the region to be processed. When it is determined that there is a region to perform exception handling, the image-to-be-superimposed acquisition unit 13 and the superimposition unit 14 perform the exception handling (S10). Then, the superimposition unit 14 performs superimposition processing that overlays the image to be superimposed on the region to be processed, including the exception handling in Step S10 (S11).

On the other hand, in Step S12, the superimposition unit 14 tentatively arranges the image to be superimposed acquired in Step S7 for superimposition on the region to be processed (S12). It is also determined in this step, as in Step S9, whether there is a region to perform exception handling (S13). When it is determined that there is a region to perform exception handling, the image-to-be-superimposed acquisition unit 13 and the superimposition unit 14 perform the exception handling (S14). Then, the superimposition unit 14 performs superimposition processing of the image to be superimposed on the region to be processed by the lightness adding algorithm, including the exception handling in Step S14 (S15).

In Step S16, adjustment of the color tone or the like may be performed on the image obtained by the superimposition processing based on an instruction from a user or automatically by the system (S16). Further, in Step S16, processing of adding a sound to the image can be performed. Then, the output unit 15 outputs the image to be processed where the image to be superimposed is superimposed by the superimposition unit 14 (S17).

An image creation program that causes a computer to function as the image creation device 1 is described hereinafter with reference to FIG. 13. The image creation program P1 includes a main module m10, an acquisition module m11, a region information acquisition module m12, an image-to-be-superimposed acquisition module m13, a superimposition module m14, and an output module m15.

The main module m10 is a part that exercises control over the image creation processing.

The functions implemented by executing the acquisition module m11, the region information acquisition module m12, the image-to-be-superimposed acquisition module m13, the superimposition module m14 and the output module m15 are respectively the same as the functions of the acquisition unit 11, the region information acquisition unit 12, the image-to-be-superimposed acquisition unit 13, the superimposition unit 14 and the output unit 15 of the image creation device 1 shown in FIG. 1.

The image creation program P1 is provided through a storage medium 1D such as CD-ROM or DVD-ROM or semiconductor memory, for example. Further, the information creation program P1 may be provided as a computer data signal superimposed onto a carrier wave over a communication network.

According to the image creation device 1, the image creation method and the image creation program P1 described above, the designation of the region L to be processed in the image to be processed is received, and the image to be superimposed that is acquired based on the attributes of the image to be superimposed associated with the parameters indicating the features of the region L to be processed is superimposed on the region L to be processed. The image C to be superimposed showing a liquid in motion is thereby superimposed on the region to be processed, which is a part of the image to be processed that is a still image in some cases, and therefore the image of a liquid in motion can be superimposed on the region showing a liquid in the static state in the still image of the food not being heated, for example. Accordingly, it is possible to obtain the food image showing ingredients that look delicious because they are not being heated and a liquid such as a soup that looks delicious because it is in motion. Further, because the image to be superimposed is acquired based on the feature parameters that affect the motion of a liquid, it is not necessary that the features of the motion of a liquid are represented in the region L to be processed. Further, because the appropriate image C to be superimposed based on the features of the region L to be processed is acquired by the computer based only on the easy input such as the designation of the region L to be processed, it is possible to easily obtain the food image where both of the ingredients and the soup look delicious.

Second Embodiment

Figure 14:
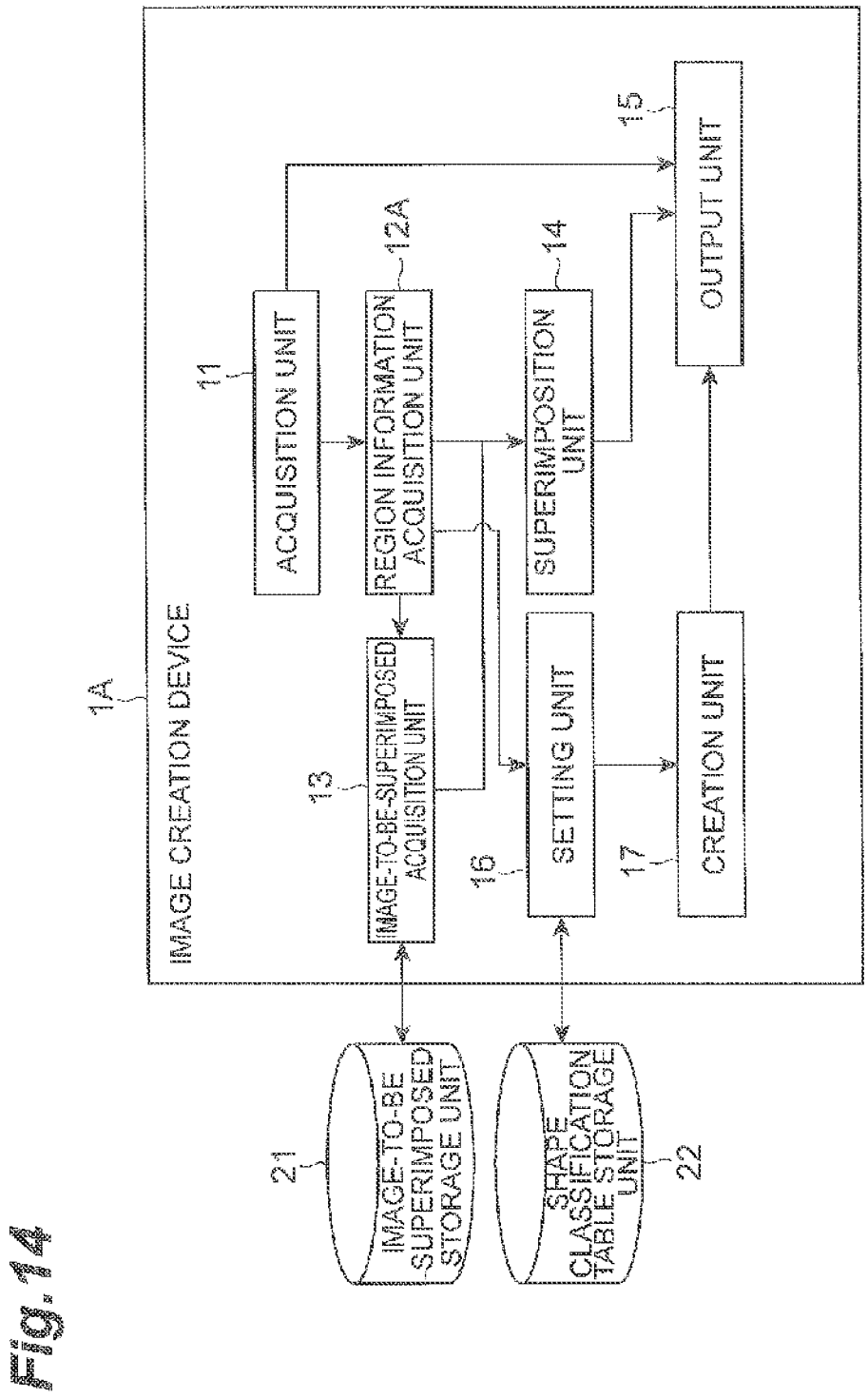
FIG. 14 is a block diagram showing a functional configuration of an image creation device according to a second embodiment.

FIG. 14 is a block diagram showing a functional configuration of an image creation device 1A (video creation device) according to a second embodiment. The image creation device 1A is a device that acquires region information that specifies an object region in which an object in the image to be processed is shown and creates a video to be displayed so that the object looks vibrating. In this embodiment, assuming that the object region is a region where an ingredient is shown in a food image showing ingredients such as vegetables and meat in a soup, an example of creating a video showing the state where the ingredients vibrate by heating is described. Note that, although a still image showing food is used as the image to be processed in this embodiment, a food image including a moving image of ingredients with a small motion may be used as the image to be processed.

The image creation device 1A functionally includes an acquisition unit 11, which is the same as that in the image creation device 1, a region information acquisition unit 12A, an image-to-be-superimposed acquisition unit 13, a superimposition unit 14, an output unit 15, a setting unit 16 and a creation unit 17. Further, the setting unit 16 can access a storage means such as a shape classification table storage unit 22.

The acquisition unit 11 is a part that acquires an image to be processed. As described in the first embodiment, the acquisition unit 11 acquires a food image showing a hot pot dish with ingredients such as vegetables and meat in a soup as shown in FIG. 3 as the image to be processed.

The region information acquisition unit 12A is a part that acquires region information that specifies an object region in which an object to be processed is shown in the image to be processed. In this embodiment, the region information acquisition unit 12A receives the designation of the object region by a user as the region information. The receiving of the designation of the object region is described with reference to FIG. 4. As described in the first embodiment, the region information acquisition unit 12A can receive the designation of the region to be processed and further receive the designation of the object region, which is a region where an ingredient is shown. For example, the region information acquisition unit 12A receives the designation of the object region S where an ingredient is shown based on the input of a line drawn by a user on a part where an ingredient is shown. In FIG. 4, the line for designating the object region S is indicated by a dotted and dashed line. Note that the region information acquisition unit 12A may acquire the object region that is specified by a known image processing technique such as a region divider using color information of the image, for example, a the region information.

The setting unit 16 is a part that sets a fixed control point, a vibration control point and a vibration direction in the object based on the shape of the object region S received by the region information acquisition unit 12A. The shape of the object region S is obtained by the designation by a user or known image processing. The fixed control point and the vibration control point indicate the part which is fixed in position and the part which vibrates with respect to the fixed control point, respectively, when creating a video to be displayed with the object vibrating. The vibration direction indicates the direction in which the vibration control point vibrates with respect to the fixed control point. The setting unit 16 makes those settings by referring to the shape classification table storage unit 22.

Further, the setting unit 16 receives the designation of the attribute indicating change in shape or no change in shape of the object from a user and, when receiving the attribute indicating change in shape, sets the fixed control point, the vibration control point and the vibration direction for the object region.

Figure 15:
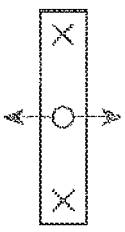
FIG. 15 is a diagram showing a configuration of a shape classification table storage unit and an example of data stored therein.

The shape classification table storage unit 22 is a storage means that stores an object shape and the fixed control point, the vibration control point and the vibration direction in association with each another. FIG. 15 is a diagram showing a configuration of the shape classification table storage unit 22 and an example of data stored therein. As shown in FIG. 15, the shape classification table storage unit 22 stores the shape of each object, the fixed control point, the vibration control point and the vibration direction in association with each other for each shape type ID. In the table of FIG. 15, the fixed control point is indicated by the cross, the vibration control point is indicated by the circle, and the vibration direction is indicated by the arrow.

Figure 16:
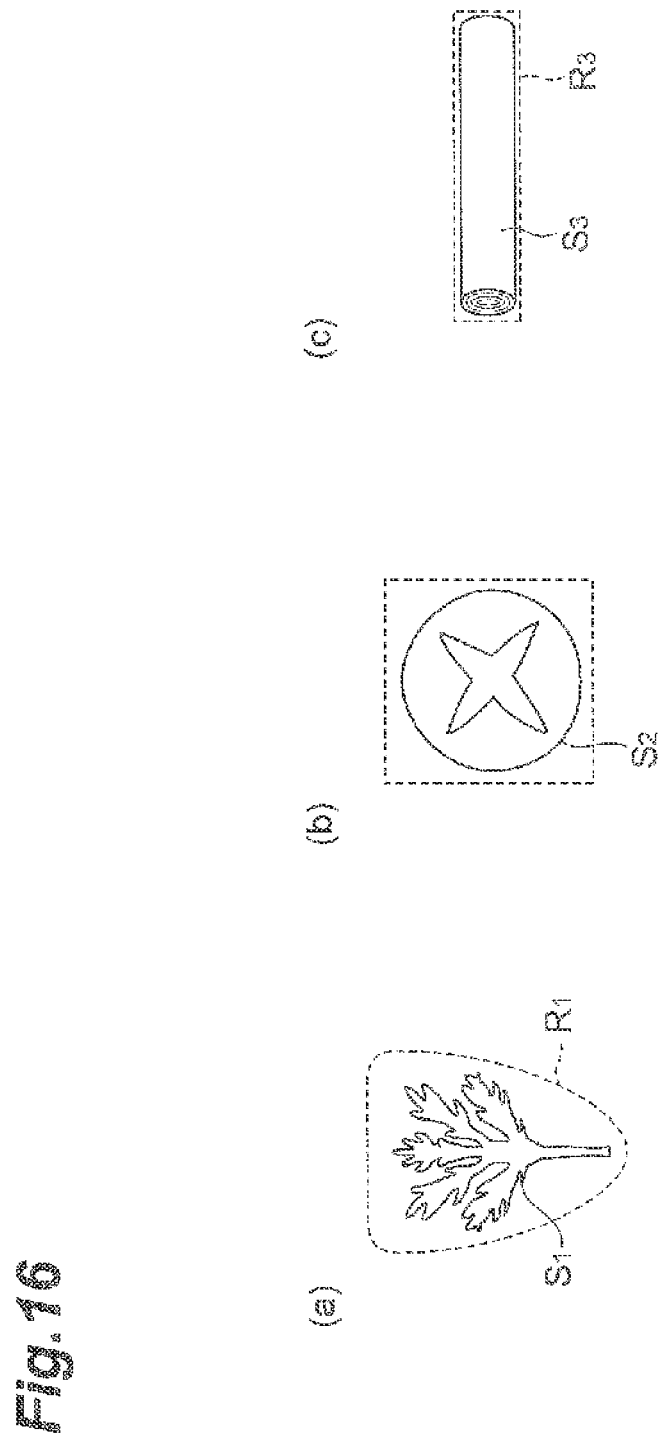
FIG. 16 is a diagram showing examples of an object region and its shape received by a region information acquisition unit.

FIG. 16 is a diagram showing examples of the object region S and its shape R received by the region information acquisition unit 12A. In this embodiment, it is assumed that the attribute of the object such as change in shape or no change in shape and the shape of the object region S are designated by a user. FIG. 17 is a diagram showing a table that stores the attribute indicating change in shape or no change in shape and the shape type that are designated for each object region S.

In the example shown in FIG. 16(a), the region information acquisition unit 12A receives the designation of an object region $S_1$, assuming that the object is a leaf vegetable such as garland chrysanthemum. Because the leaf vegetable is an object that changes in shape when heated, the setting unit 16 receives the designation of the attribute "change in shape" from a user and receives the designation of the shape type ID "1" among the shape types stored in the shape table (FIG. 15) based on the shape $R_1$ of the object region $S_1$. In response to receiving the designation from a user, the setting unit 16 stores the attribute "change in shape" and the shape type "1" in association with the region ID "1" of the object region $S_1$ in the table shown in FIG. 17. Then, the setting unit 16 sets the fixed control point, the vibration control point and the vibration direction for the object region $S_1$ in accordance with the fixed control point, the vibration control point and the vibration direction associated with the shape with the shape type ID "1" in the shape classification table.

In the example shown in FIG. 16(b), the region information acquisition unit 12A receives the designation of an object region $S_2$, assuming that the object is shiitake mushroom. Because the shiitake mushroom is an object that does not change in shape when heated, the setting unit 16 receives the designation of the attribute "no change in shape" from a user. The setting unit 16 stores the attribute "no change in shape" in association with the region ID "2" of the object region $S_2$ in the table shown in FIG. 17. The setting unit 16 does not set the fixed control point, the vibration control point and the vibration direction because the attribute of the object region $S_2$ is no change in shape.

In the example shown in FIG. 16(c), the region information acquisition unit 12A receives the designation of an object region $S_3$, assuming that the object is a vegetable such as Japanese leek. Because Japanese leek is an object that changes in shape when heated, the setting unit 16 receives the designation of the attribute "change in shape" from a user and receives the designation of the shape type ID "3" among the shape types stored in the shape table (FIG. 15) based on the shape $R_3$ of the object region $S_3$. In response to receiving the designation from a user, the setting unit 16 stores the attribute "change in shape" and the shape type "3" in association with the region ID "3" of the object region $S_3$ in the table shown in FIG. 17. Then, the setting unit 16 sets the fixed control point, the vibration control point and the vibration direction for the object region $S_3$ in accordance with the fixed control point, the vibration control point and the vibration direction associated with the shape with the shape type ID "3" in the shape classification table.

FIG. 18 is a diagram showing settings of a rectangular region for setting the fixed control point, the vibration control point and the vibration direction in the object region S. FIG. 18(a) is a diagram showing an object region $S_0$ received by the region information acquisition unit 12A. The setting unit 16 calculates the lengthwise direction of the object region $S_0$ by a technique such as principal component analysis, for example, and calculates the crosswise direction that is orthogonal to the lengthwise direction in order to set the fixed control point and the like in the object region $S_0$. FIG. 18(b) is a diagram showing the lengthwise direction (X-axis direction) and the crosswise direction (Y-axis direction) that are calculated for the object region $S_0$. The setting unit 16 then sets a rectangular region $R_0$ having the sides in parallel with the lengthwise direction and the crosswise direction, in which the object region $S_0$ is inscribed as shown in FIG. 18(c). The setting unit 16 sets the fixed control point and the like in accordance with the selected shape type in the object region $S_0$ by referring to the shape classification table (see FIG. 15).

Figure 19:
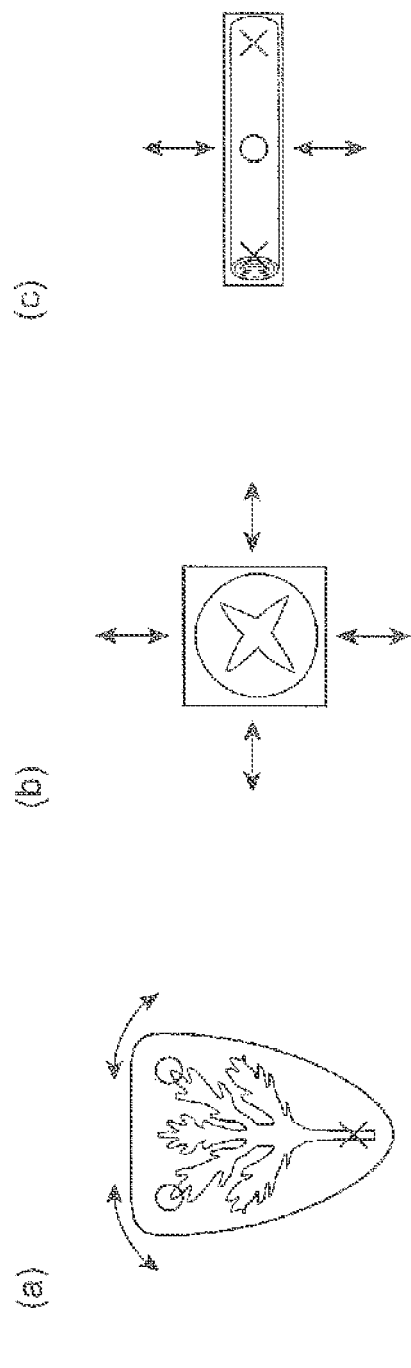
FIG. 19 is a diagram schematically showing the way of vibration in each object region received by a region information acquisition unit.

Referring back to FIG. 14, the creation unit 17 is a part that creates a video to be displayed so that the object looks vibrating in accordance with the fixed control point, the vibration control point and the vibration direction that are set by the setting unit 16. FIG. 19 is a diagram schematically showing the way of vibration in each object region S (see FIG. 16) received by the region information acquisition unit 12A.

As shown in FIG. 19(a), the creation unit 17 creates a video that is displayed so that the fixed control point indicated by the cross is fixed and the vibration control point indicated by the circle vibrates in the direction indicated by the arrows in the object region $S_1$ showing the leaf vegetable shown in FIG. 16(a).

Further, as shown in FIG. 19(b), the creation unit 17 creates a video that is displayed so that the object vibrates up, down, left and right as indicated by the arrows, maintaining its shape, in the object region $S_2$ showing the shiitake mushroom shown in FIG. 16(b).

Further, as shown in FIG. 19(c), the creation unit 17 creates a video that is displayed so that the fixed control point indicated by the cross is fixed and the vibration control point indicated by the circle vibrates up and down as indicated by the arrows in the object region $S_2$ showing the Japanese leek shown in FIG. 16(c).

Note that the creation unit 17 sets the degree of vibration of the vibration control point in accordance with the size of the object region, for example. To be specific, if it is assumed that an association between the size of the object region S and the degree of vibration is set in advance, the creation unit 17 may acquire the size of the object region S based on the number of pixels, for example, and set the degree of vibration in accordance with the acquired size of the object region S for the object region S. For example, the degree of vibration may be set smaller as the size of the object region is larger.

Further, as described in the first embodiment, in the case where the image to be superimposed, which is a video of a liquid in motion such as bubbles, is acquired based on the parameters showing the features of the region to be processed in response to receiving the designation of a region where a liquid such as a soup is shown as the region to be processed, and the acquired image to be superimposed is superimposed on the region to be processed, the creation unit 17 may control the degree of vibration of the object in accordance with the attributes of the image to be superimposed that is superimposed on the region to be processed at the position within a specified distance from the object region S. For example, the creation unit 17 may create a video where the degree of vibration of the object region S is larger as the size of the image to be superimposed that is superimposed on the position near the object region S is larger or as the playback speed is higher.

The output unit 15 outputs the image to be processed where the video that is displayed with the object region S vibrating is superimposed, which is created by the creation unit 17. To be specific, the output unit 15 outputs the image to be processed where the video that is displayed so that each of the object regions S designated in FIG. 4 looks vibrating as described with reference to FIG. 19 is superimposed.

Figure 20:
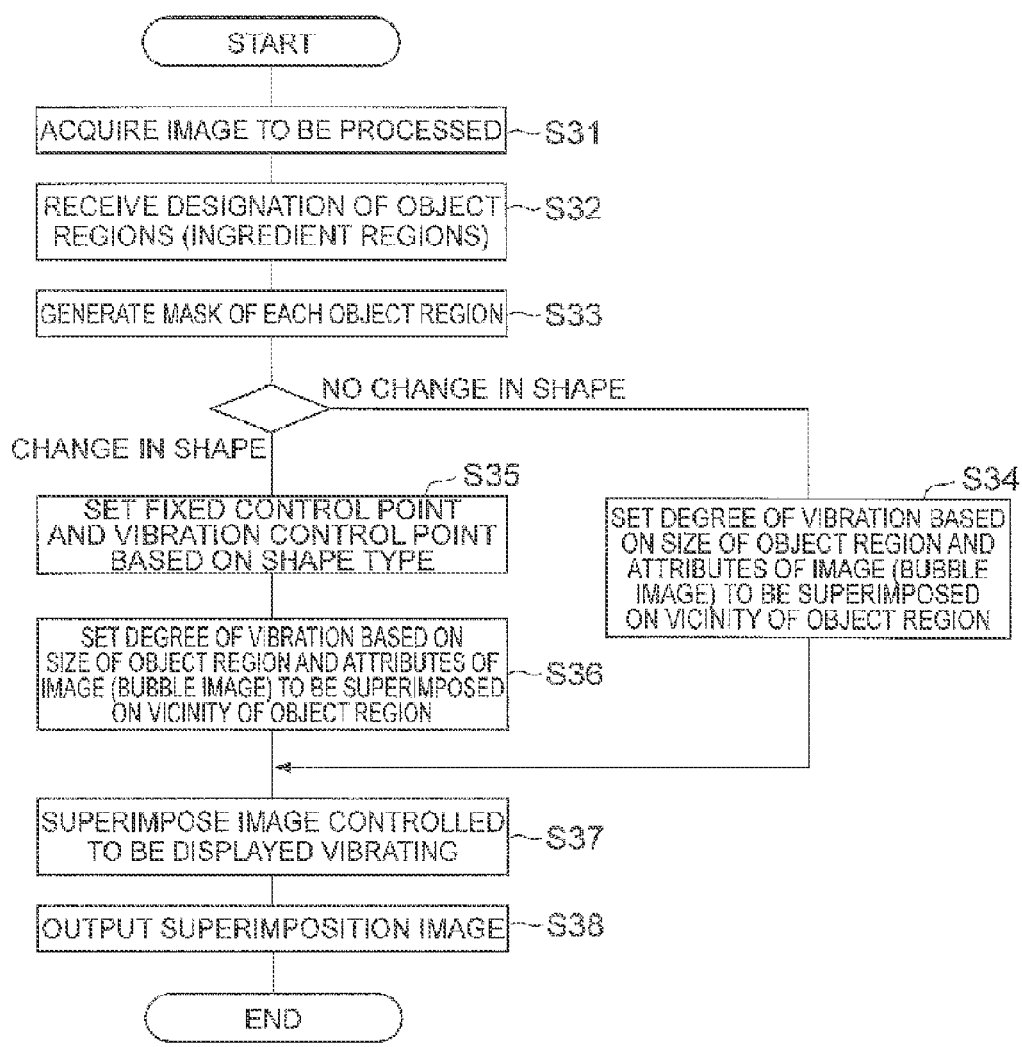
FIG. 20 is a flowchart showing an example of a process for an image creation method according to the second embodiment.

An image creation method according to the second embodiment is described hereinafter with reference to FIG. 20. FIG. 20 is a flowchart showing an example of a process for the image creation method in the image creation device 1A shown in FIG. 14.

First, the acquisition unit 11 acquires the image to be processed, which is a still image to be processed (S31). Next, the region information acquisition unit 12A receives the designation of the object regions S where ingredients in the food image are shown (S32). In this step, the region information acquisition unit 12A receives the designation of the attribute such as change in shape or no change in shape and the shape type for each of the object regions S. Then, a mask representing the object regions S in the image to be processed is generated (S33).

When "change in shape" is set as the attribute of the object region S, the process proceeds to Step S35. On the other hand, when "no change in shape" is set as the attribute of the object region S, the process proceeds to Step S34.

In Step S34, the setting unit 16 sets the degree of vibration based on the size of the object region S and the attributes of the bubble image (the image to be superimposed) that is to be superimposed on the vicinity of the object region S (S34).

On the other hand, in Step S35, the setting unit 16 sets the fixed control point, the vibration control point and the vibration direction based on the shape type of the object region S (S35). Further, the setting unit 16 sets the degree of vibration based on the size of the object region S and the attributes of the bubble image (the image to be superimposed) that is to be superimposed on the vicinity of the object region S (S36).

After that, the creation unit 17 creates a video that is displayed so that the object region S look vibrating and superimposes the video on the image to be processed (S37).

Then, the output unit 15 outputs the superimposition image where the object regions S that are displayed vibrating are superimposed (S38).

Figure 13:
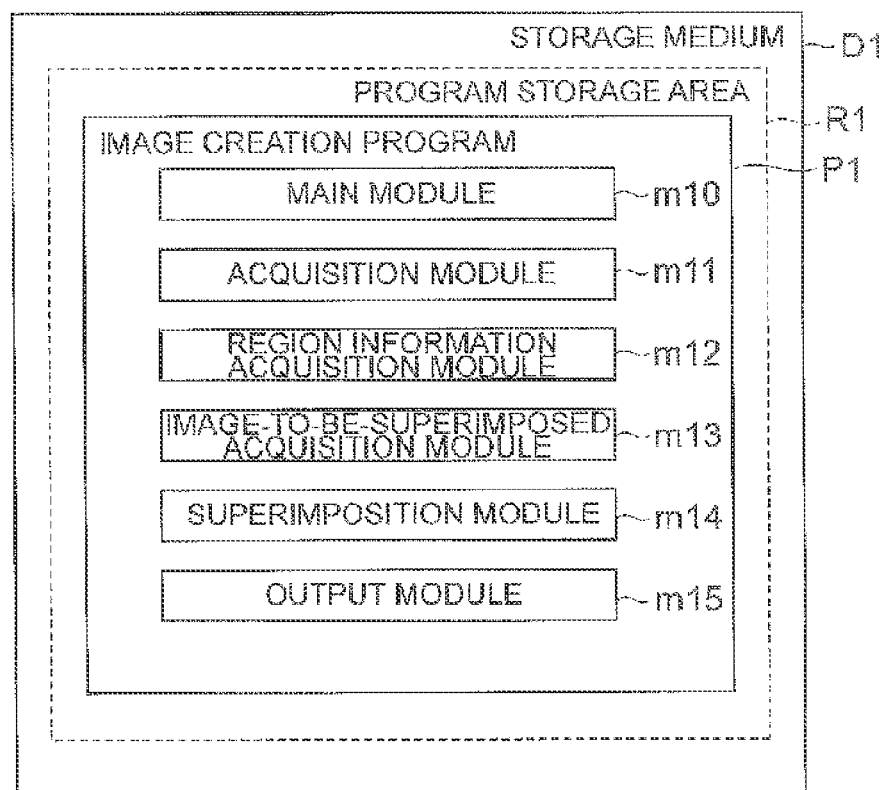
FIG. 13 is a diagram showing a configuration of an image creation program.

Note that an image creation program that causes a computer to function as the image creation device 1A (see FIG. 14) is configured by the image creation program P1 having a setting module that implements the function of the setting unit 16 and a creation module that implements the function of the creation unit 17 in addition to the modules included in the image creation program P1 shown in FIG. 13.

According to the image creation device 1A, the image creation method and the image creation program according to the second embodiment described above, the region information that specifies the object region S in the image to be processed is acquired, and a video that is displayed so that the object looks vibrating in accordance with the fixed control point, the vibration control point and the vibration direction set for the object region S is created. The video is superimposed on the image to be processed, and it is thereby possible to display the ingredients in the still image of food not being heated so that they look vibrating as the objects. It is thereby possible to add the motion like being heated to the region where ingredients that look delicious in terms of the color and shape because they are not being heated are shown, and it is possible to obtain the food image where both of the ingredients and the soup look delicious. Further, because the object region where an ingredient is shown is displayed to look vibrating based only on simple input that designates the region where an ingredient is shown as the object region, it is possible to easily obtain the food image where both of the ingredients and the soup look delicious.

Hereinbefore, the present invention has been described in detail with respect to the embodiment thereof. However, the present invention is not limited to the above-described embodiment. Various changes and modifications may be made therein without departing from the scope of the invention.

Further, the present invention may be applied to the case of superimposing the image to be superimposed showing the state where bubbles are formed in a region where oil around a hamburger is shown on a picture of a cold hamburger and thereby showing the state where the hamburger is being grilled or just after grilled. Furthermore, the present invention may be applied to the case of superimposing the image to be superimposed showing the state where bubbles are formed in a region on the surface of a fish on a picture of a cold fish and thereby showing the state just after grilled. Note that the region to be processed may be any region designated by a user, and it is not limited to the region where a liquid is shown.

1,1A . . . image creation device, 11 . . . acquisition unit, 12,12A . . . region information acquisition unit, 13 . . . image-to-be-superimposed acquisition unit, 14 . . . superimposition unit, 15 . . . output unit, 16 . . . setting unit, 17 . . . creation unit, 21 . . . image-to-be-superimposed storage unit, 22 . . . shape classification table storage unit, C . . . image to be superimposed, F . . . reference position, L . . . region to be processed, D1 . . . storage medium, m10 . . . main module, m11 . . . acquisition module, m12 . . . region information acquisition module, m13 . . . image-to-be-superimposed acquisition module, m14 . . . superimposition module, m15 . . . output module, P1 . . . image creation program, S . . . object region

What is claimed is:

1. A video creation device comprising:
at least one memory operable to store program code;
at least one processor operable to read the program code and operate as instructed by the program code, the program code including:
image acquisition code configured to cause the at least one processor to acquire an image to be processed;
region information acquisition code configured to cause the at least one processor to acquire region information specifying an object region where an object to be processed is shown in the image to be processed;
setting code configured to cause the at least one processor to determine a shape of the object region specified by the region information, and set a fixed control point, a vibration control point and a vibration direction in the object based on the determined shape of the object region by referring to a storage configured to store a plurality of shapes of the object, the plurality of shapes of the object being respectively associated with different combinations of a fixed control point indicating a part to be fixed in position, a vibration control point indicating a part to vibrate with respect to the fixed control point, and a vibration direction indicating a direction of vibration of the vibration control point when the object vibrates; and
creation code configured to cause the at least one processor to create a video to be displayed with the object vibrating in accordance with the fixed control point, the vibration control point and the vibration direction set by the setting code.

2. The video creation device according to claim 1, wherein
the storage stores the fixed control point, the vibration control point and the vibration direction in association with a rectangular region indicating an object shape, and
the setting code causes the at least one processor to set a rectangular region having sides in parallel with a lengthwise direction of the object region obtained by specified image processing and a crosswise direction orthogonal to the lengthwise direction and in which the object region is inscribed, and set the fixed control point, the vibration control point and the vibration direction for the rectangular region by referring to the storage.

3. The video creation device according to claim 1, wherein
the setting code causes the at least one processor to receive designation of an attribute indicating change in shape or no change in shape of the object from a user and, when the attribute indicating change in shape is received, set the fixed control point, the vibration control point and the vibration direction for the object region, and
the creation code causes the at least one processor to create a video to be displayed with the object vibrating in accordance with the fixed control point, the vibration control point and the vibration direction set by the setting code when the attribute indicating change in shape is received by the setting code, and create a video to be displayed with the object vibrating, maintaining the shape of the object region, when the attribute indicating no change in shape is received by the setting code.

4. The video creation device according to claim 1, wherein the creation code causes the at least one processor to control a degree of vibration of the object in accordance with a size of the object region.

5. The video creation device according to claim 1, wherein the region information acquisition code causes the at least one processor to acquire a region to be processed which is a region outside the object region in the image to be processed and on which an image to be superimposed being a video where a liquid in motion is shown is to be superimposed, the video creation device further comprises image-to-be-superimposed acquisition code configured to cause the at least processor to acquire the image to be superimposed based on a parameter indicating a feature of the region to be processed acquired by the region information acquisition code, and superimposition code configured to cause the at least one processor to superimpose the image to be superimposed acquired by the image-to-be-superimposed acquisition code on the region to be processed, and the creation code causes the at least one processor to set a degree of vibration of the object in accordance with an attribute of the image to be superimposed that is superimposed on the region to be processed at a position within a specified distance from the object region.

6. A video creation method executed by a computer, comprising:

acquiring an image to be processed;

acquiring region information specifying an object region where an object to be processed is shown in the image to be processed;

determining a type of a shape of the object region specified by the region information;

setting a fixed control point, a vibration control point and a vibration direction in the object based on the determined shape of the object region by referring to a storage configured to store a plurality of shapes of the object, the plurality of types of the shape of the object being respectively associated with different combinations of a fixed control point indicating a part to be fixed in position, a vibration control point indicating a part to vibrate with respect to the fixed control point, and a vibration direction indicating a direction of vibration of the vibration control point when the object vibrates; and creating a video to be displayed with the object vibrating in accordance with the fixed control point, the vibration control point and the vibration direction that are set.

* * * * *